US009002583B2

United States Patent
Gruener et al.

(10) Patent No.: US 9,002,583 B2
(45) Date of Patent: Apr. 7, 2015

(54) METHOD AND DEVICE FOR THE COMPENSATION OF STEERING WHEEL ROTARY OSCILLATIONS IN A STEERING SYSTEM

(71) Applicant: ZF Lenksysteme GmbH, Schwaebisch Gmuend (DE)

(72) Inventors: Stefan Gruener, Auenwald (DE); Thomas Nierobisch, Leinzell (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 36 days.

(21) Appl. No.: 13/735,361

(22) Filed: Jan. 7, 2013

(65) Prior Publication Data

US 2013/0124048 A1    May 16, 2013

Related U.S. Application Data

(63) Continuation of application No. PCT/EP2011/061471, filed on Jul. 7, 2011.

(30) Foreign Application Priority Data

Jul. 12, 2010   (DE) .......................... 10 2010 031 211

(51) Int. Cl.
- *G06F 9/00* (2006.01)
- *B62D 6/00* (2006.01)
- *B62D 5/04* (2006.01)

(52) U.S. Cl.
CPC ............... *B62D 6/00* (2013.01); *B62D 5/0472* (2013.01)

(58) Field of Classification Search
USPC .............. 701/31.4, 36, 41, 42, 1, 22; 180/443–447; 318/607–608, 400.22, 318/400.15
See application file for complete search history.

(56) References Cited

U.S. PATENT DOCUMENTS

| | | | |
|---|---|---|---|
| 5,894,205 A | 4/1999 | Shimizu et al. | |
| 6,219,604 B1 * | 4/2001 | Dilger et al. | .................... 701/41 |

(Continued)

FOREIGN PATENT DOCUMENTS

| | | |
|---|---|---|
| DE | 10 2005 003 180 | 7/2006 |
| DE | 10 2008 021 856 | 11/2009 |

(Continued)

OTHER PUBLICATIONS

"A Construction of Disturbance Observer to Cope with Frequency Variation and its Application to Vibration Suppression Control System" Katsuhiko Fuwa; Tatsuo Narikiyo; Hisashi Kandoh Proceedings of the 17th World Congress—The International Federation of Automatic Control Seoul, Korea, Jul. 6-11, 2008 pp. 2696-2701.

(Continued)

*Primary Examiner* — Dalena Tran
(74) *Attorney, Agent, or Firm* — Jordan and Hamburg LLP

(57) ABSTRACT

A torque actuator is regulated so as to permit an activation of the torque actuator such that steering wheel rotary oscillations that occur can be compensated. For this purpose, in one embodiment, a torsion bar torque is detected. A compensation torque is determined as a function of the detected torsion bar torque by means of a variable-frequency disturbance variable and state variable calculator. The compensation torque or a signal corresponding to the compensation torque is then taken into consideration during activation of the torque actuator.

16 Claims, 3 Drawing Sheets

(56) References Cited

U.S. PATENT DOCUMENTS

| | | |
|---|---|---|
| 6,681,165 B2 | 1/2004 | Shibasaki et al. |
| 7,684,912 B2 | 3/2010 | Nishimura |
| 7,860,624 B2 | 12/2010 | Kubota et al. |
| 7,983,815 B2 | 7/2011 | Kurishige et al. |
| 8,019,507 B2 | 9/2011 | Kurishige et al. |
| 8,090,502 B2 | 1/2012 | Brosig et al. |
| 8,626,394 B2 * | 1/2014 | Kezobo et al. ............ 701/41 |
| 2002/0056587 A1 | 5/2002 | Shibasaki et al. |
| 2006/0069481 A1 | 3/2006 | Kubota et al. |
| 2006/0180369 A1 | 8/2006 | Brosig et al. |
| 2008/0243329 A1 | 10/2008 | Hamel et al. |
| 2009/0000857 A1 | 1/2009 | Sugiyama et al. |
| 2009/0125186 A1 | 5/2009 | Recker et al. |
| 2009/0143938 A1 | 6/2009 | Nishimura |
| 2010/0235047 A1 | 9/2010 | Kurishige et al. |
| 2011/0137525 A1 | 6/2011 | Kurishige et al. |

FOREIGN PATENT DOCUMENTS

| | | |
|---|---|---|
| DE | 10 2008 036 001 | 2/2010 |
| EP | 1 640 246 | 3/2006 |
| EP | 1 650 106 | 4/2006 |
| EP | 1 839 998 | 10/2007 |
| EP | 1 975 040 | 10/2008 |
| EP | 2 006 188 | 12/2008 |
| EP | 2 028 080 | 2/2009 |
| JP | 2004-161073 | 6/2004 |

OTHER PUBLICATIONS

"Implementation of Disturbance Attenuation System Based on Frequency Estimation" Tatsuo Narikiyo; Katsuhiko Fuwa; Takeshi Murano Proceedings of the 17th World Congress The International Federation of Automatic Control Seoul, Korea, Jul. 6-11, 2008 pp. 2702-2707.

* cited by examiner

METHOD AND DEVICE FOR THE COMPENSATION OF STEERING WHEEL ROTARY OSCILLATIONS IN A STEERING SYSTEM

This is a Continuation of PCT/EP2011/061471 filed Jul. 7, 2011.

BACKGROUND OF THE INVENTION

The invention relates to a method for the compensation of steering wheel rotary oscillations during operation of a steering system in a vehicle, wherein the steering system comprises an activatable torque actuator.

The invention also relates o a device for the compensation of steering wheel rotary oscillations in a steering system, wherein the steering system comprises an activatable torque actuator.

Steering wheel rotary oscillations occur in a vehicle particularly when there are imbalances on the wheels. Steering wheel rotary oscillations are also referred to as "shimmy" or "smooth road shake". Such steering wheel rotary oscillations are usually damped or reduced by various measures since they are perceived as disruptive. By way of example, it is known to partially compensate imbalance-induced oscillations by means of design measures, such as for instance, the use of damping elements. It is also known to provide additional electronic control elements and/or sensors and to reduce the steering wheel rotary oscillations by means of appropriate activation of the control elements.

Electric power steering systems (EPS) have a torque actuator known as an EPS motor. To reduce steering wheel rotary oscillations, it is known to provide suitable activation of the EPS motor. By way of example, the current torsion bar torque is detected by means of a torque sensor. High-frequency components of the steering torque are defined as a disturbance and are damped via a characteristic that is dependent on the vehicle speed and the steering speed as well as the torque. In this case, however, among other things, desired feedback from the road is incorrectly detected as a disturbance and is therefore eliminated or at least reduced. This has negative effects on the steering feel and can bring disadvantages in terms of safety since important information regarding the road may no longer be available to the driver. Such a system is known, for example, from EP 1 839 998 A1.

EP 1 650 106 B1 also discloses a method for reducing steering wheel rotary oscillations, in which counter-oscillations are introduced into the steering system at an appropriate point by means of an electric motor. As a result, rotary oscillations that occur are partially compensated. In the known method, a current steering wheel torque is required, which is examined for the presence of periodic oscillations within a time window of suitable size. This method requires an additional torque sensor s well as time-consuming calculation of the compensation torque by means of an autocorrelation or cross-correlation function.

A method for suppressing a steering wheel rotary oscillation is known from US 2009/0000857 A1. In the known method, the angular velocity a rotor of an electric motor that assists the steering is determined. Using this variable, a compensation current is calculated by means of a frequency estimation unit, a phase correction unit and a vibration suppression unit which is positioned thereon and which requires the calculated frequency and phase as input variables. Due to the servo connection to the steering, however, the angular velocity of the rotor is only somewhat suitable as a measurement variable. Particularly in the event of a low power level on the rack, the rotor angular velocity cannot readily be used as a sufficiently accurate measurement variable.

A method for detecting steering wheel rotary oscillations based on a FFT (Fast Fourier Transform) of a torsion bar torque is known from JP 2004-161073. When a steering wheel rotary oscillation is detected in this known method, the system damping as a whole is increased. However, this has the disadvantage that the steering feel as a whole is impaired. An improvement to this method is known from EP 1 975 040 81, in which the FFT is determined more efficiently due to the fact that it is calculated only in narrow frequency bands, as a function of a current vehicle speed.

US 2009/0125186 A1 discloses another method for the compensation of steering wheel rotary oscillations, in which a filtered torsion bar torque is determined and a compensation variable which corresponds to the filtered torsion bar torque but which is phase-shifted through 180° is switched on for compensation purposes.

The problem addressed by the invention is that of providing a method and a device which make it possible to compensate steering wheel rotary oscillations as fully as possible without having any negative effects on the steering feel.

SUMMARY OF THE INVENTION

According to the invention, regulation of a torque actuator, that is, for example, of an EPS motor, is provided which permits activation of the torque actuator such that steering wheel rotary oscillations that occur can be fully, or in any case substantially fully, compensated. For this purpose, in one embodiment of the invention, a torsion bar torque is detected. A compensation torque is determined as a function of the detected torsion bar torque by means of a variable-frequency disturbance variable and state variable calculator. Said compensation torque, or a signal corresponding to the compensation torque, is then taken into consideration during activation of the torque actuator.

According to the invention, use is made of a variable-frequency disturbance variable and state variable calculator. This is a so-called "disturbance observer" which can be used for variable frequencies and which is also referred to as a DOFV. Disturbance observers are described, for example, in "Katsuhiko Fuwa, Tatsuo Narikiyo and Hisashi Kandoh: A Construction of Disturbance Observer to Cope with Frequency Variation and Its Application to Vibration Suppression Control System; Proceedings of the 17$^{th}$ IFAC World Congress; Seoul, Korea, Jul. 6-11, 2008". Using the disturbance observers, disturbances of known and constant frequencies can be reduced. In the case of steering wheel rotary oscillations, the disturbance frequency depends on the current vehicle speed and/or the current wheel speeds. According to the invention, therefore, use is made of a DOFV which operates reliably even at varying frequencies. A DOFV is a method based on control technology which, based on knowledge of a sinusoidal disturbance of variable frequency, a control variable and possibly further measurement variables, can be used to calculate an additional control variable that suppresses or compensates the sinusoidal disturbance of variable frequency. One DOFV is described for example in "Tatsuo Narikiyo, Katsuhiko Fuwa and Takeshi Murano: Implementation of Disturbance Attenuation System Based on Frequency Estimation; Proceedings of the 17$^{th}$ IFAC World Congress; Seoul, Korea, Jul. 6-11, 2008.

An identified model, which describes the transmission behavior from the torque of the torque actuator, i.e. for example the motor torque of the EPS motor, to the torsion bar torque, is stored in the variable-frequency disturbance variable and state variable calculator. This model comprises, in particular, the transmission behavior regarding the amplitude and phase of the respective torque or of the respective torque signal. The frequency of a current disturbance can be determined from signals which correspond to a wheel speed, that is, for example, from the wheel speed itself, a vehicle speed or a wheel angular velocity. In order to determine a current disturbance amplitude as well as the phase position of the disturbance, a preferably filtered torsion bar torque is made available to the variable-frequency disturbance variable and state variable calculator. In one preferred embodiment, filtering of the torsion bar torque takes place by means of a variable-frequency bandpass filter, wherein the center frequency of the variable-frequency bandpass filter is set according to a current vehicle speed or wheel speed.

In order to achieve a full or substantially full compensation of the steering wheel rotary oscillation, the compensation must be maintained even when the disturbance signal is no longer present at all in the currently detected torsion bar torque, due to the compensation. Without maintaining the compensation, no compensation torque would, of course, be initially determined. As a result, however, a steering wheel rotary oscillation would again be detected in a next calculation step, which would once again lead to the generation of a compensation signal. Full compensation would thus be impossible. According to the invention, the determined compensation torque is now fed back and taken into consideration during a renewed determination of compensation torque together with the current torsion bar torque. The feedback of the compensation torque (from the previous time step) preferably takes place entirely within the variable-frequency disturbance variable and state variable calculator. By virtue of this internal feedback, the components that have already been compensated are thus taken into account in full when calculating the disturbance variable. This permits correct calculation of the disturbance signal, although the disturbance is no longer visible in the measurement signal, which is to say, in the currently detected torsion bar torque, due to the compensation torque determined in the preceding time step.

Moreover, according to the present invention, both the amplitude and the phase of the disturbance signal are determined. This takes place by means of the identified model which describes the transmission behavior and which is stored in the variable-frequency disturbance variable and state variable calculator. The model of the transmission behavior is moreover used to determine the motor torque required to compensate the disturbance variable. The variable-frequency disturbance variable and state variable calculator furthermore comprises a model of sinusoidal disturbances. By linking the filtering of the torsion bar torque, for example by means of the variable-frequency bandpass filter and the variable-frequency disturbance variable and state variable calculator in which the model of sinusoidal disturbances is stored, negative effects on the steering feel are effectively prevented.

It is particularly advantageous if the method for compensating the steering wheel rotary oscillations, which is configured in a control device of the steering system and is implemented as a model, is not permanently active, since this would require unnecessary calculation time. Advantageously, therefore, the presence of steering wheel rotary oscillations is deduced as a function of a current vehicle speed, a steering wheel angle and the amplitude of the current disturbance signal. Since steering wheel rotary oscillations occur only in a severely limited speed range and when travelling straight ahead or almost straight ahead, activation of the method according to the invention is necessary only within this time window. A model or an observer is preferably used to determine the amplitude of the disturbance signal. An amplitude of the disturbance signal that is "estimated" in this way is sufficiently accurate for the present purpose.

The amplitude of the disturbance signal thus determined can also be used to adapt the model of the transmission behavior that is stored within the variable-frequency disturbance variable and state variable calculator or also to adapt other functionalities contained in the variable-frequency disturbance variable and state variable calculator. For adaptation purposes, a scaled set of parameters of the variable-frequency disturbance variable and state variable calculator is stored, for example, in the control device of the steering system, said set of parameters being adapted to the deviations in series production of the respective steering system. In one particularly preferred embodiment of the invention, the scaling factor is adapted as a function of a current compensation quality and/or as a function of the amplitude of the steering wheel rotary oscillations that still exist despite compensation, and is thus adapted in the calculation unit.

Preferred embodiments of the invention therefore comprise an explicit modeling of the transmission behavior "motor torque to torsion bar torque" in the frequency range relevant for steering wheel rotary oscillations both in amplitude response and in phase response, for example by means of an efficient offline parameterization in the form of a measurement of the steering system on a test bench and subsequent calculation of parameters relating thereto. As a result, an approximately 50% compensation of the steering wheel rotary oscillations is already possible over all relevant frequencies, without any application in the vehicle itself being necessary.

By virtue of the model-based feedback of the disturbance information that has already been compensated, it is even possible to achieve substantially 100% compensation of the steering wheel rotary oscillations, at least in combination with correct phase position and amplitude. This very high compensation quality is further improved or is maintained by an online adaptation of the variable-frequency disturbance variable and state variable calculator according to the invention for the purpose of optimal adaptation to deviations in series production and in particular taking account of the aging of the steering system. To this end, in particular, adaptation of the transmission model, which is also used for feeding back the compensation signal, is carried out, for example, by suitable scaling of a scaled set of parameters.

Another advantage of the invention lies in the fact that a sensor system that is usually already present, which comprises, for example, a sensor for detecting a current torsion bar torque and a sensor for detecting a vehicle speed or a wheel speed, can continue to be used. Since a large part of the functionality is implemented within an integral module for disturbance variable calculation and the variable-frequency disturbance variable and state variable calculator comprises both the model-based feedback and the model of the transmission behavior, the disturbance variable and state variable calculator can be implemented in a highly efficient manner in terms of computation. By configuring such an inseparable module for calculating the compensation torque according to amplitude and phase, for example in the form of a simple state space model with additions and mu t plications, a highly efficient online calculation can be achieved. Furthermore, the invention enables explicit formulation of the disturbance variable as a sine signal, as a result of which single-frequency, rigorously selective suppression of the disturbance is achieved, without impairing steering feel.

Further features, possible uses and advantages of the invention will become apparent from the following description of examples of embodiments of the invention, which will be explained with reference to the drawings.

DESCRIPTION OF THE PREFERRED EMBODIMENTS

Figure 1:
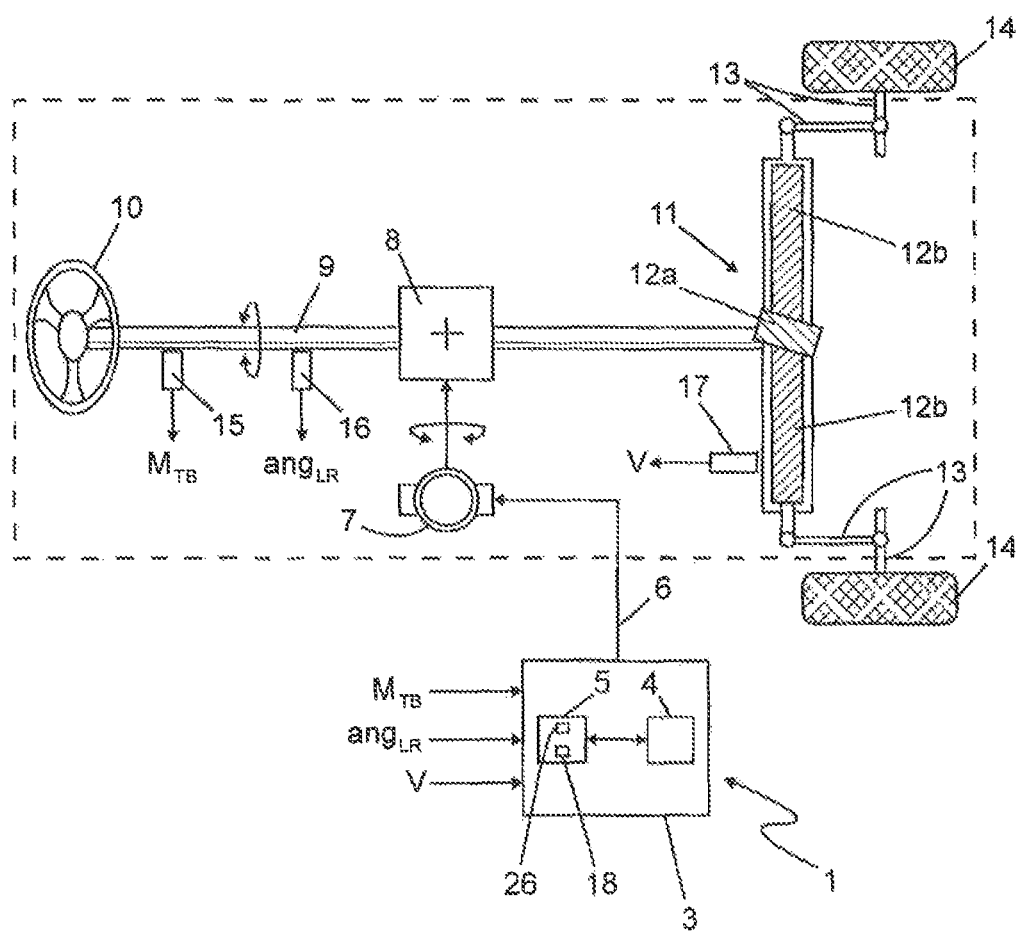
FIG. 1 shows a schematic view of a steering system in a vehicle.

FIG. 1 shows an electric steering system 1 which comprises a steering device 2 and a control device 3. Arranged in the control device 3 is a microprocessor 4 which is connected to a memory element 5 via a data line, for example a bus system. Formed in the memory element 5 are storage areas in which functional means for carrying out the method according to the invention, for example in the form of a computer program, are stored. Core fields and predefined parameters or other values may also be stored in the memory element 5.

The control device 3 is connected via a signal line 6 to a torque actuator 7 which is configured, for example, as an electric motor, so that the electric motor or the torque actuator 7 can be controlled by the control device 3. The electric motor acts on a torsion bar 9 via a transmission 8. A steering means, for example a steering wheel 10, is arranged on the torsion bar 9.

The steering device further comprises a steering gear 11, which is configured as a rack-and-pinion steering gear. The steering gear 11 is connected via a pinion 12a and a rack 12b to a steering linkage 13 on each side of the vehicle, which each cooperate with a wheel.

A torsion bar torque $M_{TB}$ can be detected by means of a sensor 15 and a steering angle $ang_{LR}$ can be detected by means of a sensor 16. The steering device further comprises a sensor 17, by means of which a vehicle speed v or a variable corresponding to a vehicle speed, such as for example a wheel speed or a wheel angular velocity, can be detected.

The values detected via the sensors 15, 16 and 17 are made available to the control device 3 via data lines (not shown in FIG. 1). The data lines may be embodied in many known ways. Preferably, a bus system is used for communicating between the control device 3 and sensors and/or actuators.

By suitable programming of the control device 3, the method according to the invention can be carried out on the steering system shown in FIG. 1, wherein the invention is then implemented both by the control device 3 and by a corresponding computer program 18. The control device then represents the device according to the invention and the computer program likewise represents the invention along with the method according to the invention which the computer program is programmed to execute.

The steering system 1 shown in FIG. 1 is set up for carrying out the method according to the invention. For example, the control device 3 is suitably programmed for this purpose. In one possible embodiment, full compensation of steering wheel rotary oscillations in a motor vehicle is possible by way of the method according to the invention, wherein suitable counter-oscillations are introduced into the steering device 2 by way of the torque actuator 7, that is, for example, the servo motor of the EPS, said counter-oscillations in turn being calculated on the basis of a disturbance signal extracted from the torsion bar 9. Preferably no additional sensors are required for this purpose, so that no modification of the existing sensors is necessary in order to implement the method according to the invention, which in turn lowers the costs.

Figure 2:
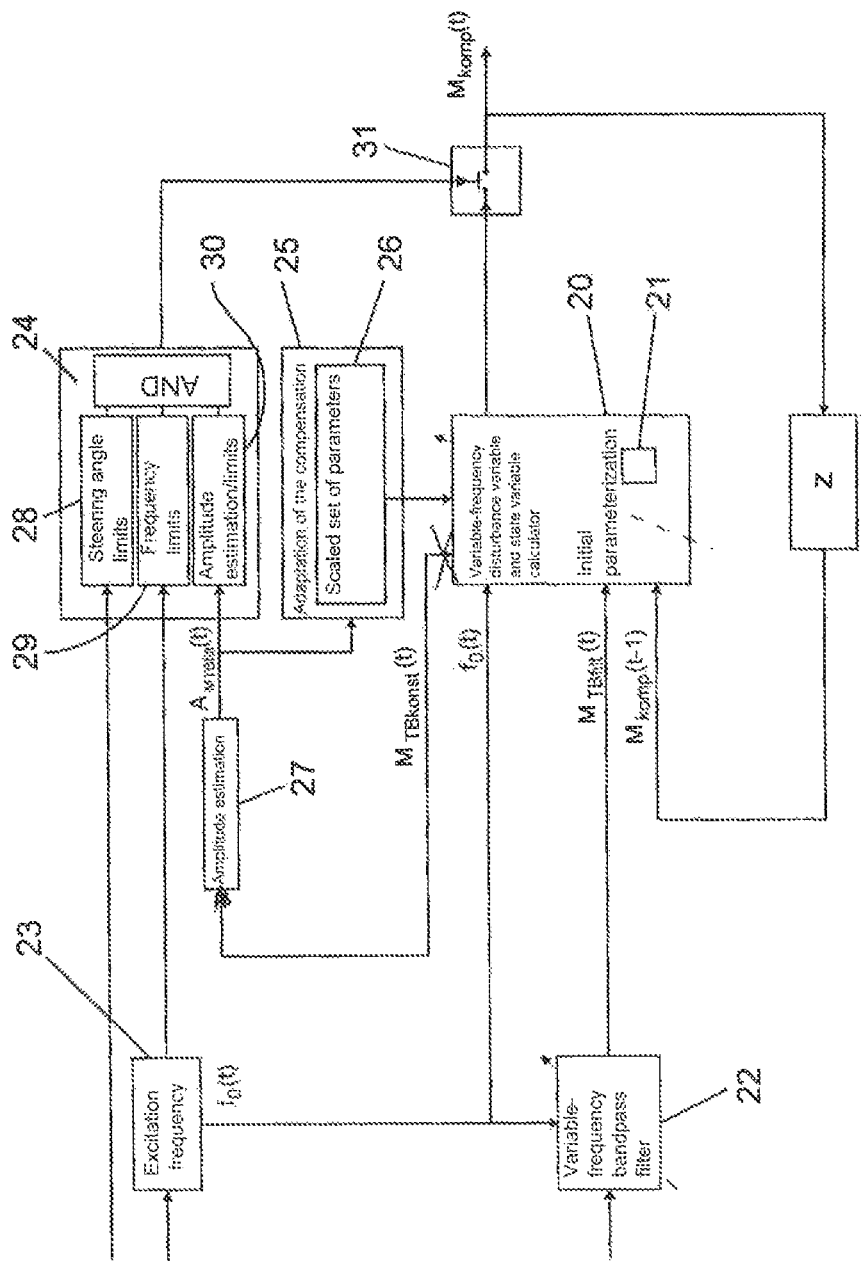
FIG. 2 shows a schematic view of a first embodiment of the invention.

FIG. 2 shows a block diagram of one possible embodiment of the invention. For activating the torque actuator 7, FIG. 2 shows a variable-frequency disturbance variable and state variable calculator 20 with an explicitly defined sinusoidal disturbance variable and internal feedback for taking account of components of the disturbance signal that have already been compensated, said calculator being stored as a computer program 18 in the control device 3, for example. Taking account of the phase response and amplitude response, the variable-frequency disturbance variable and state variable calculator 20 determines a compensation torque using a scaled model 21 of the transmission behavior between the torque actuator 7 and the torsion bar 9. In one preferred embodiment, the scaled model 21 is adapted online, that is, during operation of the steering system 1, to deviations in series production and aging of the steering system 1, as a result of which an optimal compensation of the steering wheel rotary oscillations is guaranteed.

Of central importance to the present invention is the use of the variable-frequency disturbance variable and state variable calculator 20, in which the parameterized model 21 of the transmission behavior from the motor torque to the torsion bar torque is stored. A compensation torque $M_{KOMP}(t)$ is determined by means of the variable-frequency disturbance variable and state variable calculator 20 as a function of a current torsion bar torque $M_{TB}(t)$ determined at a specific instant t, the basis of which compensation torque a signal for activating the torque actuator 7 is generated, which leads to compensation of existing steering wheel rotary oscillations. The torsion bar torque $M_{TB}(t)$ determined, for example, by means of the sensor 15, is preferably filtered by means of a variable-frequency bandpass filter 22 in order to exclude, for example, the influence of high-frequency disturbances, which is disruptive to the present system. The torsion bar torque $M_{TBfilt}(t)$ filtered in this way is finally made available to the variable-frequency disturbance variable and state variable calculator 20 for further processing.

The frequency of the variable-frequency bandpass filter 22 is set by means of an excitation frequency determiner 23, which determines an excitation frequency $f_0(t)$ from a detected speed v(t), for example a wheel speed or a wheel velocity or a vehicle speed. The determined excitation frequency $f_0(t)$ is moreover made available to the variable-frequency disturbance variable and state variable calculator 20 in order to set the frequency thereof. To ensure that the compensation torque $M_{KOMP}(t)$ is maintained even when a steering wheel rotary oscillation is no longer perceptible in the torsion bar torque $M_{TB}(t)$ due to the compensation that has taken place according to the invention, the respectively calculated compensation torque $M_{KOMP}(t-1)$ is taken into account for calculating the compensation torque $M_{KOMP}(t)$ by way of feedback of the compensation torque $M_{KOMP}(t-1)$ which is preferably integrated in the variable-frequency disturbance variable and state variable calculator 20. This feedback takes place with the model 21, which is to say the transmission behavior regarding the phase response and amplitude response between the torque actuator 7 and the torsion bar 9, taken into account.

In the particularly advantageous embodiment of the invention shown in FIG. 2, the compensation is adapted. To this end, in an adaptation block 25, a scaled set of parameters 25 is modified in order to compensate for aging of the steering system 1 and/or deviations in series production, and thus constantly ensure optimal performance of the method according to the invention. The set of parameters is stored, for example, in the control device 3. In the present case, the effects of aging of the steering on the transmission behavior from motor torque to torsion bar torque are particularly important. Therefore, the model 21 is notably adapted by way of the scaled set of parameters 26. The detection of aging of the steering system 1 takes place in the adaptation block 25 as a function of a current amplitude $A_{MTB}(t)$, which is preferably found by means of an amplitude estimation unit 27 from a constructed torque $M_{TBkonst}(t)$. $M_{TBkonst}(t)$ represents the disturbance variable obtained from the addition of $M_{TBfilt}(t)$ and the already compensated disturbance components in the torsion bar torque, calculated by feeding back $M_{KOMP}(t-1)$. If the compensation is not active, the constructed torque $M_{TBkonst}(t)$ corresponds to the filtered torsion bar torque $M_{TBfilt}(t)$. In contrast, when the compensation is active, the disturbance signal must be reconstructed. In this case, the constructed torque $M_{TBkonst}(t)$ is therefore dominated by the feedback, while the filtered torsion bar torque $M_{TBfilt}(t)$ makes only a small contribution. The amplitude $A_{MTB}(t)$ of the residual oscillation thus determined is an indication of the compensation quality and thus provides information as to whether there should be adaptation for deviations in series production of the steering and/or due to aging of the steering system, In the example of embodiment shown in FIG. 2, a steering wheel rotary oscillation detection unit 24 is additionally provided. This makes it possible to activate or deactivate the generation of a compensation torque $M_{KOMP}(t)$ depending on whether there is currently steering wheel rotary oscillation. Steering wheel rotary oscillations usually occur only within a strictly limited speed range and when travelling straight ahead, and therefore activation of the function for determining the compensation torque is necessary only in these time windows. In the embodiment shown by way of example in FIG. 2, the steering wheel rotary oscillation detection unit 24 comprises a module 28, in which a steering wheel angle $ang_{LR}(t)$, currently detected for example by means of the sensor 16, is checked to ascertain whether the current steering angle is within predefined limits. It is thus possible to ascertain whether the vehicle is currently moving straight ahead or substantially straight ahead. In a module 29, the current excitation frequency $f_0(t)$ is checked to ascertain whether this is within predefined frequency limits, from which it can in turn be deduced whether the vehicle is moving within a given speed range.

In a module 30, a check is carried out to ascertain whether the current amplitude $A_{MTB}(t)$ is within predefined limits. The evaluations carried out by means of the modules 28, 29 and 30 are fed to a module 31, which finally triggers activation or deactivation of the variable-frequency disturbance variable and state variable calculator 20. To this end, it may be provided that the evaluation results determined by means of the modules 28, 29 and 30 are combined by a logical AND operation in the module 31. The steering wheel rotary oscillation detection unit 24 thus permits activation of the determination of the compensation torque $M_{KOMP}(t)$ if a current steering angle moves within predefinable steering angle limits, a current excitation frequency is within predefined frequency limits and a current amplitude of the detected torsion bar torque is within predefined amplitude limits. If these three conditions exist, the presence of a steering wheel rotary oscillation is deduced and the generation of the compensation torque is activated.

One particular advantage of the present invention lies in the fact that, during the determination of the compensation torque $M_{KOMP}(t)$, this torque is precisely determined with regard to both the amplitude thereof as well as the phase response. Switching-on a compensation torque with a phase of 180° alone cannot lead to a full compensation of steering wheel rotary oscillations, since it has been found that the phase response is not constant at 180°.

Figure 3:
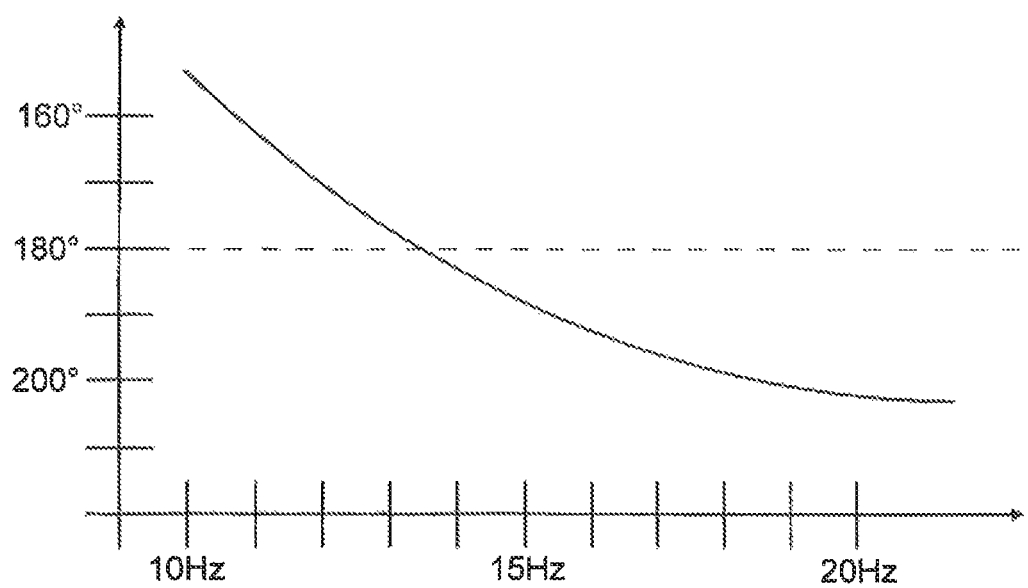
FIG. 3 shows an example of a phase response of a steering system in a frequency range relevant for steering wheel rotary oscillations.

FIG. 3 shows by way of example, for a possible steering system 1, a relationship between the excitation frequency on the one hand and the respective phase position on the other hand. In FIG. 3, the phase response of a steering system in the frequency range from approximately 10 to approximately 20 Hz, which is relevant for steering wheel rotary oscillations, is shown schematically. In this example, it can be seen that the phase response at a frequency of approximately 10 Hz lies at 160° and the phase response at 20 Hz is approximately 195°. The model-based feedback, and the fact that the phase response is explicitly taken into account according to the invention when determining the compensation signal, allow significant improvement in the compensation quality in comparison to the known methods and devices.

The invention claimed is:

1. A method of compensating for steering wheel rotary oscillations due to imbalances on wheels of a vehicle during operation of a steering system in said vehicle, said steering system comprising an activatable torque actuator, the method comprising:
    determining a current torsion bar torque;
    determining a compensation torque as a function of the current torsion bar torque; and
    activating the torque actuator as a function of the compensation torque;
    wherein the torsion bar torque or a first variable determined as a function of the torsion bar torque is fed to a variable-frequency disturbance variable and state variable calculator which contains a model of a sinusoidal disturbance of steering wheel rotary oscillations and a model of a transmission behavior from a torque of the torque actuator; and
    wherein the compensation torque is determined by the variable-frequency disturbance variable and state variable calculator using the model of the sinusoidal disturbance of steering wheel rotary oscillations.

2. The method according to claim 1, wherein an amplitude and a phase of the steering wheel rotary oscillation are taken into account by the variable-frequency disturbance variable and state variable calculator when determining the compensation torque.

3. The method according to claim 1, wherein a component of the steering wheel rotary oscillations that has already been compensated is taken into account when determining the compensation torque.

4. The method according to claim 3, wherein the compensation torque is fed back to the variable-frequency disturbance variable and state variable calculator.

5. The method according to claim 1, wherein the model of the transmission behavior describes the transmission behavior at least in a frequency range relevant to the steering wheel rotary oscillations with regard to an amplitude response and a phase response.

6. The method according to claim 1, further comprising testing for existence of said steering wheel rotary oscillations, and wherein the compensation torque is determined when said existence of said steering wheel rotary oscillations is deduced from said testing.

7. The method according to claim 6, wherein the existence of said steering wheel rotary oscillations is deduced if a vehicle speed, a wheel speed or a variable correlating with the wheel speed is within a predefinable range and the steering system is being operated at least substantially in a straight-ahead position.

8. The method according to claim 6, wherein said testing comprises evaluating a current amplitude of the torsion bar torque, said current amplitude being determined as an estimate.

9. The method according to claim 1, further comprising filtering the detected torsion bar torque and the filtered torsion bar torque is fed to the variable-frequency disturbance variable and state variable calculator to determine the compensation torque.

10. The method according to claim 9, wherein said filtering is performed by a variable bandpass filter, and an excitation frequency is formed as a function of a vehicle speed, a wheel speed or a variable correlating with the wheel speed, and a center frequency of the variable bandpass filter is selected as a function of the excitation frequency.

11. The method according to claim 1, wherein the variable-frequency disturbance variable and state variable calculator is parameterized with regard to at least one parameter variable and an adaptation of at least one function of the variable-frequency disturbance variable and state variable calculator in order to compensate deviations in series production and/or in order to compensate an aging of the steering system is performed by modifying the at least one parameter variable.

12. The method according to claim 11, wherein the at least one parameter variable is modified as a function of a determined compensation quality.

13. The method according to claim 12, wherein the compensation quality is determined by evaluating an amplitude of a remaining residual oscillation in the torsion bar torque.

14. The method according to claim 1, wherein the variable-frequency disturbance variable and state variable calculator is configured as an inseparable module which determines the compensation torque as a function of the torsion bar torque, wherein the variable-frequency disturbance variable and state variable calculator comprises the model of the transmission behavior.

15. A device for compensating for steering wheel rotary oscillations due to imbalances on wheels of a vehicle during operation of a steering system in said vehicle, wherein the steering system comprises an activatable torque actuator and means for determining a current torsion bar torque, and wherein the device comprises:

a variable-frequency disturbance variable and state variable calculator for determining a compensation torque, and which contains a model of a sinusoidal disturbance of steering wheel rotary oscillations and a model of a transmission behavior from a torque of the torque actuator;

means for activating the torque actuator as a function of the compensation torque;

wherein the torsion bar torque or a first variable determined as a function of the torsion bar torque is fed to the variable-frequency disturbance variable and state variable calculator; and wherein the compensation torque is determined by the variable-frequency disturbance variable and state variable calculator using the model of the sinusoidal disturbance of steering wheel rotary oscillations.

16. The device according to claim 15, configured to implement a method comprising:

determining a compensation torque as a function of the current torsion bar torque; and activating the torque actuator as a function of the compensation torque.

* * * * *